Nov. 22, 1949 — R. J. HERBOLD — 2,489,220
LIGHT SENSITIVE ALTITUDE AND DIRECTION INDICATOR
Filed March 15, 1945 — 3 Sheets-Sheet 1
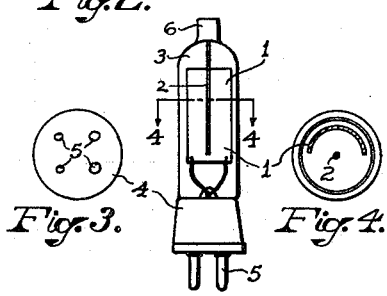
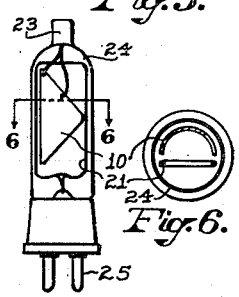
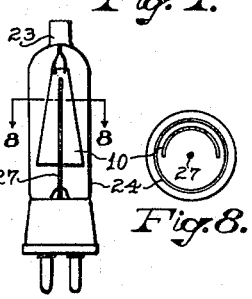
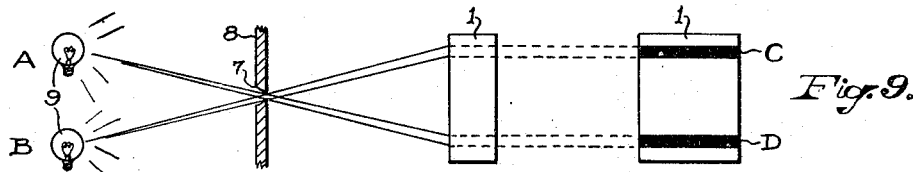
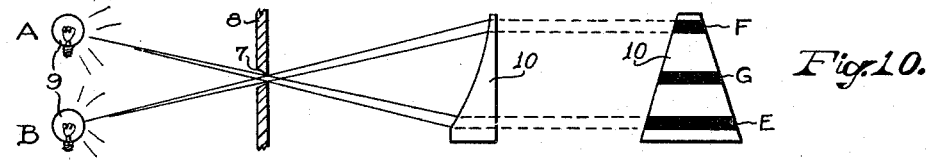
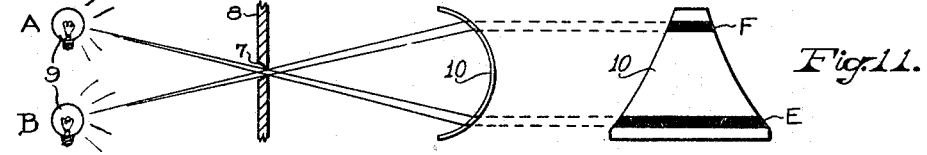
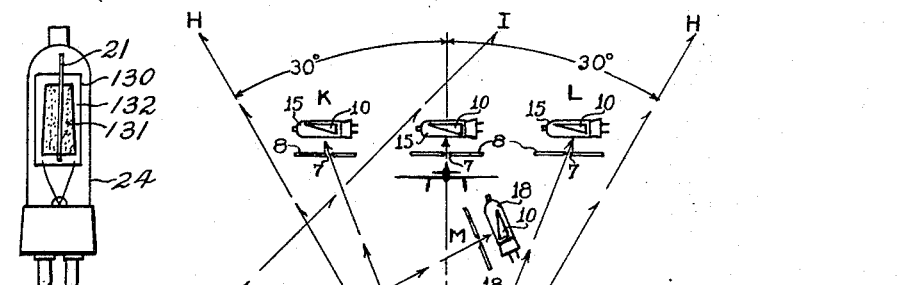
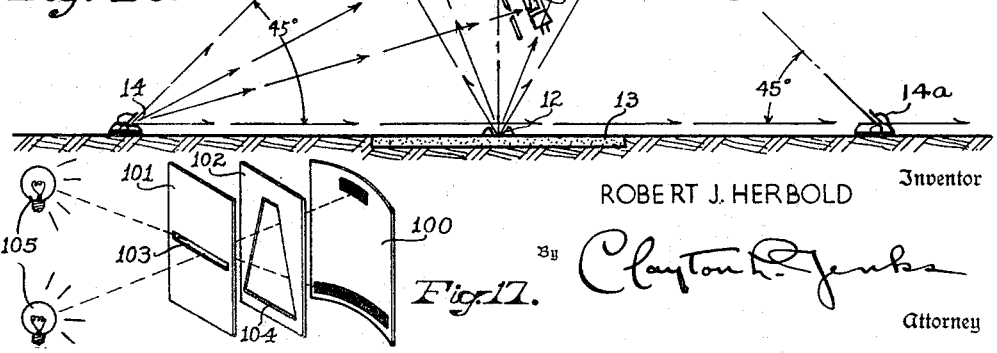
ROBERT J. HERBOLD Inventor
By Clayton R. Jenks
Attorney Nov. 22, 1949     R. J. HERBOLD     2,489,220
LIGHT SENSITIVE ALTITUDE AND DIRECTION INDICATOR
Filed March 15, 1945     3 Sheets-Sheet 2
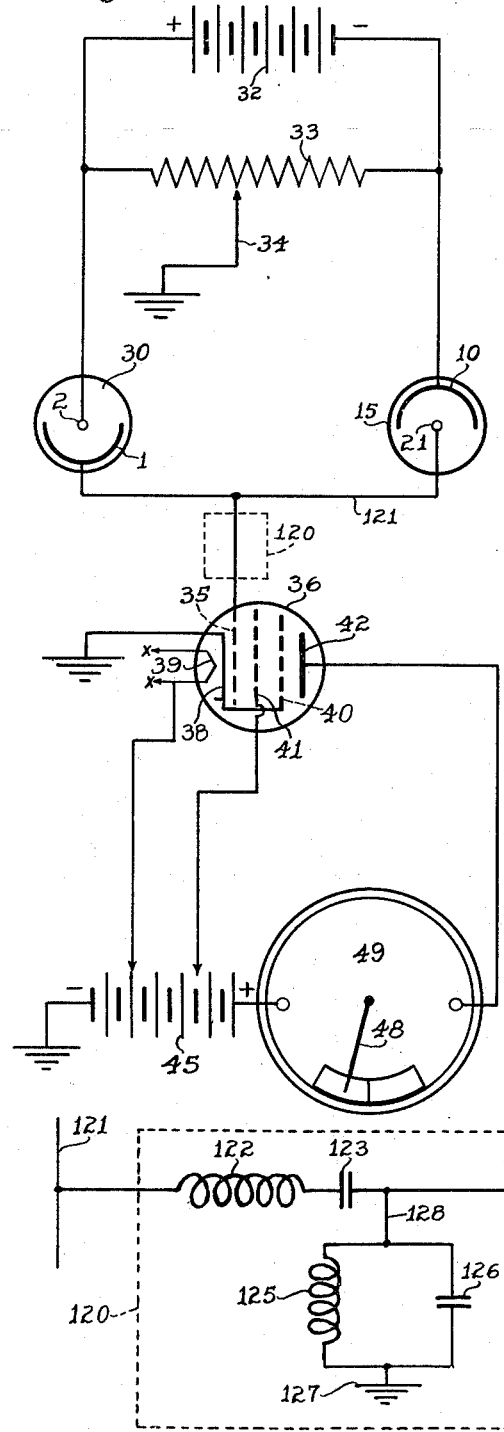
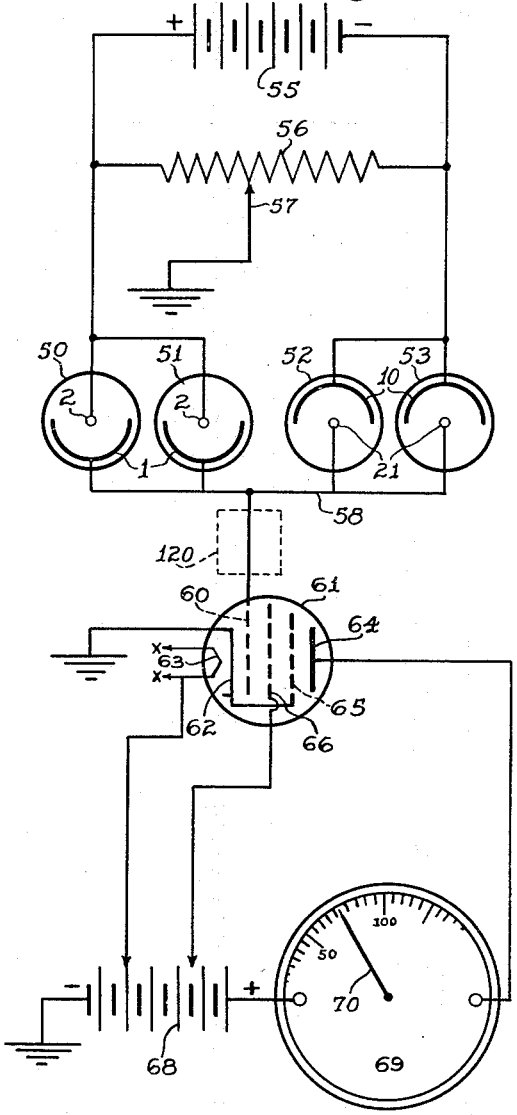
ROBERT J. HERBOLD, Inventor
By Clayton L. Jenks
Attorney Nov. 22, 1949 R. J. HERBOLD 2,489,220
LIGHT SENSITIVE ALTITUDE AND DIRECTION INDICATOR
Filed March 15, 1945 3 Sheets-Sheet 3
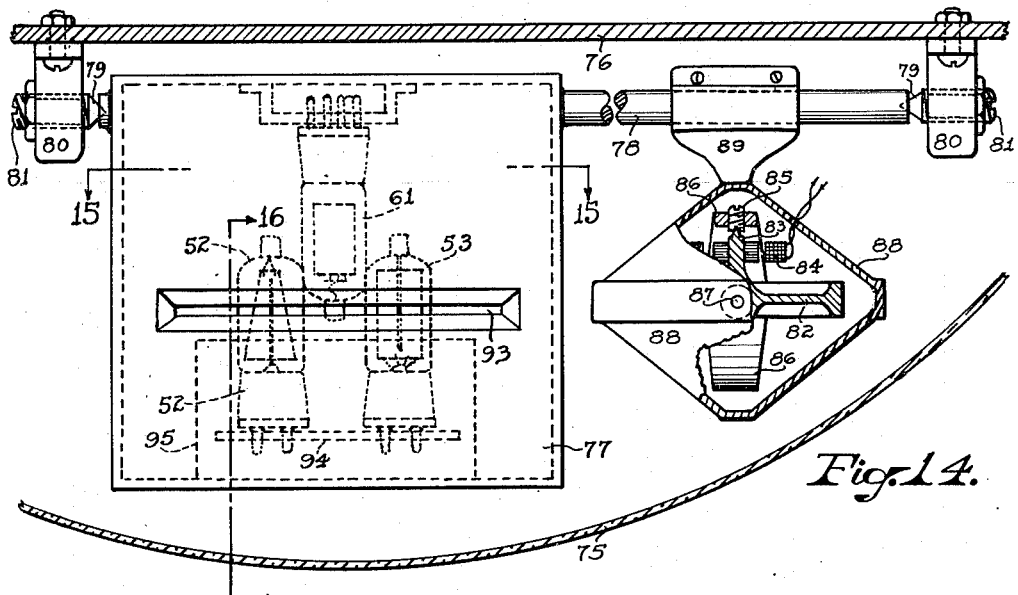
Fig.14.
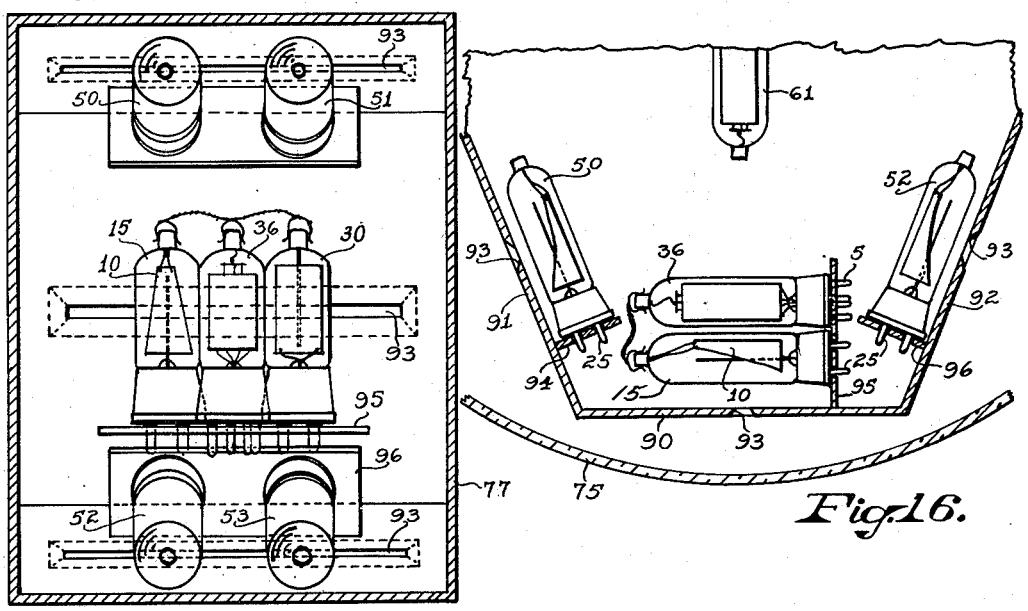
Fig.15.
Fig.16.
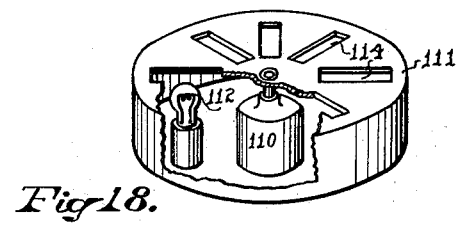
Fig.18.
ROBERT J HERBOLD Inventor
By Clayton L. Jenks
Attorney Patented Nov. 22, 1949

2,489,220

UNITED STATES PATENT OFFICE 2,489,220

LIGHT-SENSITIVE ALTITUDE AND DIRECTION INDICATOR

Robert J. Herbold, Denver, Colo., assignor to Lafayette M. Hughes, Denver, Colo.

Application March 15, 1945, Serial No. 582,918

13 Claims. (Cl. 33—46)

1

This invention relates to apparatus for aiding the landing of aircraft and more particularly for guiding the craft into alignment with the airport runway and progressively determining the altitude of the craft thereover.

In accordance with my instrument landing system, a light source is so arranged at the airport as to insure alignment of the descending craft with the runway and a row of lights is located parallel with and at a known distance from the center line of the runway so that by triangulation of the apparent light position the altitude of the craft may be determined. Apparatus on the craft, including a photosensitive element, is so constructed that when the element is activated by an airport light, an instantaneous characteristic of the apparatus determines the alignment or the altitude of the craft.

The primary object of this invention is to provide apparatus for my instrument landing system which is simple in its construction and efficient in its operation and which will make it possible to land an aircraft safely at the airport although the runway may be partially or fully obscured from the pilot's vision by fog, rain, snow, dust or other atmospheric conditions.

Another object is to provide electrical apparatus including a photosensitive element which involves but few mechanical or moving parts and which maintains the photo element in a light activated position during the required period.

Another object is to provide electrical guidance apparatus for indicating the alignment and the altitude of the craft which is so constructed that the light rays which determine alignment and altitude will be selectively used without either interfering with the operation of the apparatus controlled by the other.

A further object is to provide apparatus including a photosensitive element for determining alignment or altitude which is not affected by the normal stray light that is present at an airport.

A still further object is to provide aircraft guidance apparatus that gives substantially the same desired guidance and indication of position within a given range of aircraft flight irrespective of the intensity of the light received.

Another object is to provide guidance apparatus having a special type of phototube which will produce a variable electron emission that varies as the directive angularity of a light ray changes relative to the cathode of the tube. Further objects will be made apparent in the following disclosure.

2

In the practice of my invention, I make use of that principle of electronics in accordance with which the emission of electrons from the light sensitive cathode of a phototube is proportional to the amount of light which impinges thereon. That is, the electric current in a phototube circuit is directly proportional to the electron emission per second, and this emission for a given cathode material depends upon the light intensity and the color or wave length of the light, and it varies inversely as the square of the distance from the light source. The illumination on the cathode and therefore the electron emission also varies with the cosine of the angle of incidence of the light rays. These hold true for a wide range of light intensities and for light of various colors which remain substantially unchanged in composition. Hence, for a given angle of incidence of light of unchanging wave length and for a definite intensity of illumination, the current in the phototube circuit varies directly with the area of the sensitized cathode which receives and is activated by the light rays.

I propose to determine indirectly the angle of incidence of an airport light ray on the cathode of a phototube on the aircraft, and from that to triangulate the distance of the light and the altitude of the aircraft above the same, or to obtain alignment with the runway. For that purpose, I have provided a photosensitive tube with a cathode which has its light sensitive surface area so shaped and/or arranged relative to a light aperture that as the position of the aircraft varies relative to a fixed line of light parallel with the runway center line and extending throughout the effective distance of aircraft approach at the airport, a beam of light therefrom will activate a progressively changing area of cathode and thereby give a progressively varying electron emission and current generated thereby. Such a cathode may be triangular and so arranged relative to a light aperture in an opaque wall that light rays of different incident angles will activate cathode areas of different sizes and so give different current values; or the light activated area on the cathode may be varied optically.

Referring to the drawings illustrating preferred embodiments of this invention:

Fig. 1 is a schematic view showing the relationship of airport guiding lights to the craft and the directive angularity of light beams therefrom relative to the cathodes of phototubes mounted on an aircraft;

Fig. 2 is a vertical elevation of a standard photosensitive tube;

Fig. 3 is a bottom plan view of the same;

Fig. 4 is a transverse section on the line 4—4 of Fig. 2;

Fig. 5 is a vertical elevation of a new type of phototube having a triangularly shaped cathode;

Fig. 6 is a section on the line 6—6 of Fig. 5;

Fig. 7 is a vertical elevation of a modified form of my tube;

Fig. 8 is a section on the line 8—8 of Fig. 7;

Fig. 9 is a diagrammatic view showing how a light in two positions A and B may activate different but equal areas of the cathode of a standard phototube of Fig. 2, the right hand portion of the figure showing the arcuate cathode turned at right angles to illustrate the area of activation;

Fig. 10 is a similar diagrammatic view showing the relationship of the two positions of the light to the activated areas of the triangular cathode of Fig. 7;

Fig. 11 is a similar view showing the activated areas on the cathode of Fig. 5;

Fig. 12 is a wiring diagram of a preferred type of electric circuit for determining the alignment of an aircraft with the center line of the runway as it approaches the airport;

Fig. 13 is a preferred electrical circuit for determining the altitude of the aircraft over the runway with which it is aligned;

Fig. 14 is an elevation partly in section showing one embodiment of my invention in which phototubes are gyroscopically held in a light receiving position on the bottom of an aircraft;

Fig. 15 is a section on the line 15—15 of Fig. 14;

Fig. 16 is a section on the line 16—16 of Fig. 14;

Fig. 17 shows diagrammatically an optical system of screens arranged to provide a varying activation of the cathode;

Fig. 18 is a perspective, diagrammatic view, partly broken away, of apparatus for sending intermittently flashing light rays from the airport; and Fig. 19 is a wiring diagram of a portion of the amplifier circuit that includes a band pass filter arranged to be tuned to the frequency of the flashing light; and Fig. 20 is a vertical elevation of a modification of the phototube.

Referring first to Figs. 2, 3 and 4, I have there illustrated a standard photosensitive tube of the electron emissive type which I propose to use in the practice of my invention. This comprises a cathode 1, which may be rectangular and bent to a partial cylindrical concave shape. An anode 2, usually a vertical wire, is arranged at the axis of the cathode arc. The two electrodes are suitably arranged in an evacuated or gas filled tube 3 of glass or other material provided with a base 4 and the supporting prongs 5. One prong may be electrically connected with the cathode, and a cap 6 at the top of the tube may be suitably connected with the anode; or various other standard arrangements and constructions may be employed. The photosensitive inner surface of the cathode has a coating comprising a suitable metal, such as lithium, sodium, potassium, rubidium or caesium, the choice of which depends largely upon the type of light to be received. For light from a standard electric light bulb, and particularly one which gives a high emission of infrared rays, the cathod may be made of a base metal of silver coated with caesium on caesium oxide. Such a cathode, which I prefer, is activated by wave lengths betweeen 3,000 and 11,000 Angstrom units, and it is highly sensitive to the infrared rays.

If that standard tube of Figs. 2 to 4 is connected in a suitable circuit as will be explained, and if the cathode receives light rays through an elongated aperture 7 (Fig. 9) in a wall 8, then when the light source 9 is moved from position A to position B, the light rays will fall upon equal areas C and D of the cathode 1, disregarding the angles of incidence of the rays, and the electron emission will be the same for either angular position of the light. If, however, the cathode 10 is made substantially triangular in shape and bent in an arc and arranged as shown in Figs. 5 and 6, then the light 9 in position A of Fig. 11 will illuminate a large area E at the wide end of the cathode and only a small area F when in position B. Similarly, Fig. 10 shows how the triangular cathode of Figs. 7 and 8 will be illuminated. Hence, the electron emission and the resultant current will vary progressively as the apparent light position is moved. I employ this principle to determine the alignment and the altitude of an aircraft over the runway of an airport.

Referring now to Fig. 1, I mount a light, and preferably a row of spaced lights 12, in alignment with the center line of the runway 13 of the airport and an extension thereof throughout the effective distance of aircraft approach, and these alignment lights are preferably so shielded that their beams lie within a definite angle, such as 30° on each side of a vertical plane as indicated by the lines H, H. Altimeter lights 14 in another aligned series are arranged at a known distance from and parallel to the runway center line and its extension, and these lights are so shielded that their rays project only within an angle between a horizontal plane and another suitably located plane, such as one which is inclined at 45° to the horizontal, as represented by the line I. That is, they shine toward the runway and upwardly and are therefore so located as to be seen optically by a phototube on the aircraft when the craft is over the runway and has reached a low enough altitude to come within the angle of light projection. If the row of lights 14 is 200 feet from the runway center line, then the craft will pick up a 45° projected light beam at a 200 foot elevation above the center of the runway.

In accordance with one aspect of this invention, I use the triangular cathode 10 of Figs. 5 to 8 inclusive in an alignment phototube 15 (Fig. 1) which is so mounted on the aircraft relative to a light aperture 7 in a wall 8 that when vertically over the center line of the runway the central band G of activated cathode area (Fig. 10) will give a definite current measurement that is translated by a calibrated instrument to indicate a perfect alignment. When the aircraft with its phototube is at either side of the runway, such as positions K and L, the activated areas F and E (Figs. 10 and 11) of the triangular cathode 10 are respectively less and greater than the central activated area G, and so the electron emission gives different and warning current measurements. A similar phototube 18, adapted to determine the altitude of the craft over the runway center, produces a greater electron emission as the light rays from source 14 move from the apex towards the base of the triangular cathode 10 when the aircraft descends from the line I through the positions M and N to the ground.

The electron emission, other things being equal, will be proportional to the size of the activated area. Consequently, I may triangulate the angle of incidence of the light beam by measuring the current generated by that particular area of the cathode which is activated for a given apparent light position.

A photoemissive tube of this new type may be made as shown in Figs. 5 and 6 in which the cathode 10 is substantially triangular in shape, but preferably bent in a concave cylindrical arc, with its greatest width at the left hand side and tapering to a narrow width at the right hand side. As illustrated in Fig. 20, the cathode 130 may have a standard rectangular shape and only a tapered area 131 may be coated with the light sensitive material. The outer portion 132 is an opaque non-sensitive material which frames and limits the area of the tapered area that is light sensitive. The anode 21 may be shaped as a rectangular loop of wire so arranged as not to obstruct materially the passage of the light rays or to cast a wide shadow on the cathode. In this construction, the cathode 10 is suitably suspended from the top and connected to a cap 23 on the outside of the tube casing 24. The anode loop may be supported on a vertical wire connected to one of the prongs 25 which serve to mount the unit on the base, or the connections and supports may be reversed. The tube casing 24 may be a standard light transmitting envelope of glass, or if it is made of opaque material, may comprise a light transmitting window, as is well known in the art.

The cathode 10 may be shaped and arranged as shown in Figs. 7 and 8 with its wider base portion at the bottom and its narrower portion at the top and bent in a concave arc with its axis parallel or coinciding with the axis of the substantially cylindrical tube casing 24. The cathode is shown as suspended from wires connected with the cap 23. The anode 27 may be either the loop shown in Fig. 5 or a straight wire as shown in Fig. 7. The phototube of Fig. 5 operates with the axis of the tube casing 24 parallel with the long dimension of the aperture slot 7 in the wall 8 (Fig. 11) while the tube of Fig. 7 is arranged with the axis of the tube casing 24 perpendicular to the aperture slot (Fig. 10), so that the light beam may in each case travel from the wide to the narrow end of the triangular shape. The cathode in this special type of tube may be made similar to the cathode of a standard tube as above described, such as a silver plate coated with caesium on caesium oxide. I prefer that the phototube carrying this triangularly shaped cathode be made the same as the standard phototube employed in my electric circuits, so that the difference in action between the two tubes will be governed solely by the area of the activated portion of each cathode.

This special type of phototube is employed to govern desired indicating or control apparatus that guides the aircraft or its pilot. This is preferably accomplished by applying a required voltage to the tube so that when activated it will permit a current to flow. This electrical signal is preferably amplified to insure satisfactory results under all atmospheric conditions, and this may be done by so arranging the phototube circuit that it controls the grid potential of an amplifier tube in a secondary power circuit which in turn operates or governs the guidance indicators or control apparatus.

In order that variations in light density caused by fog, snow, rain, dust and other atmospheric conditions may not affect materially the operation of the device, I prefer a construction in which my special type of phototube (Figs. 5 to 8) having a triangular cathode 10 is balanced against a standard tube having a rectangular cathode; and the parts are so arranged in electrical circuits that any variation in angular incidence of the light beam on the two balanced tubes gives a current variation that is related to that angle. Also, by employing two balanced phototubes, the variation in current which is proportional to the cosine of the angle of incidence of the light affects these two cathodes alike, and thus that factor of a variable angle of illumination is cancelled. In my preferred construction, I employ a pair of balanced phototubes for determining the alignment of the craft with the runway and a separate pair of balanced phototubes, and preferably a pair on each side of the craft, for determining its altitude. If two rows of lights 14 and 14a (Fig. 1) are arranged on opposite sides of the center line of the airport runway, then one of the pairs of altimeter phototubes may be omitted or not used.

In its mechanical construction and its electric circuits, the device is comparatively simple. Referring first to Fig. 12, which shows the circuits for indicating alignment of the aircraft with the airport runway, I have balanced a standard vacuum phototube 30 against my special type of vacuum phototube 15, by connecting the two tubes in series with a source of power so that one acts as the load for the other. As above described, the cathode 1 of the standard tube 30 is rectangular in shape and as a partial cylindrical surface, and the straight anode wire 2 is arranged at its axis. The other tube 15, as above described, has a tapering or triangular cathode 10 and an anode 21 as above described suitably arranged relative thereto. Each of the tubes is so arranged on the aircraft that their cathodes point at the same angle toward a light source on the ground. A battery 32, or other suitable source of power, has its negative terminal connected to the specially shaped cathode 10 and its positive terminal connected to the anode 2 of the standard tube. A potentiometer resistance 33 connects across the terminals of the battery, and an adjustable contact 34 for the resistance is grounded into the framework of the aircraft. The vacuum photo tubes are operated at saturation voltage and the maximum cathode emission for the weakest light condition and the current voltage characteristics are such that the circuit is very sensitive and the difference in light reception of the two cathodes gives a large change in voltage. That is, the cathode gives a saturation current under all normal conditions of use, and any variation in light intensity as caused by fog, rain or snow will not affect the indicator reading.

In this arrangement, if one tube receives more light than the other, its resistance decreases and the voltage distribution between the two tubes changes. That voltage variation in the phototube circuit is employed to vary the potential of a grid 35 of a suitable amplifying tube 36, such as the standard pentode illustrated in the drawings. The cathode 38 of the pentode is grounded to the framework as shown, and it is indirectly heated by a filament wire 39 to which A. C. or D. C. current is suitably applied. In this construction, a screen grid 40, connected to the cathode, and a suppressor grid 41 are located between the main grid 35 and the anode plate 42, and the parts are suitably mounted and arranged as is well understood. A battery 45 of suitable voltage is grounded at its negative terminal and connected as illustrated to supply the necessary current and potentials to the electrodes and grids of the amplifying tube 36, as is understood by one skilled in the electronic art. The parts are so constructed and arranged that when the potential of the grid 35, which is normally biased to a negative condtion, is made less negative by the phototube circuit, the electron emission from the heated cathode 38 will be increased greatly and pass to the anode plate 42, and current derived from the battery 45 will flow and actuate the needle 48 of a milliammeter 49 of suitable construction, such as a galvanometer. The amplified power may actuate any other suitable guidance instrument which indicates the desired flight condition or controls the flight.

The contact arm 34 of the potentiometer resistance may be adjusted when the phototubes are located directly over the center line of the runway so that the neddle 48 points vertically downwards, and the circuits are so arranged and the meter parts so calibrated that when the plane flies to the left of that center line (Fig. 1) the needle will point toward the right or directly toward that alignment light source. When the plane is at the right, the needle will point toward the light source at the left. That is, the potentiometer contact 34, as well as the amplifier circuit, is balanced to give a middle reading or vertical position for the ammeter needle when the V-shaped cathode 10 of the special phototube receives light at about its middle portion G (Fig. 10) and thus gives an electron emission intermediate between the values obtained when the light beam activates the oposite ends of the cathode.

For measuring altitude, I may employ a similar circuit arrangement, as shown in Fig. 13, in which two standard phototubes 50 and 51 coupled in parallel are arranged in series with two of my above described special tubes 52 and 53 which are also in parallel. The tubes 50 and 52 may point toward the left side of the aircraft and tubes 51 and 53 towards the right, so that one pair of balanced tubes in series will receive the light for either direction of flight of the aircraft relative to the runway. The anodes 2 of the standard tubes 50 and 51 are connected with the positive terminal of a suitable battery 55, or other source of power, and their cathodes connect with the anodes 21 of the two special phototubes 52 and 53, constructed as shown in Figs. 5 or 7, and whose cathodes 10 are connected to the negative battery terminal. A potentiometer resistance 56 across the battery terminals is grounded through a variable contact 57 with the framework of the aircraft. A series connection 58 between the two pairs of tubes leads to the grid 60 of a suitable amplifier tube 61, such as the standard pentode illustrated. This amplifier comprises a directly heated cathode 62, or one indirectly heated by a heater 63, and an anode plate 64. The screen grid 65 and suppressor grid 66 are employed and connected according to standard usage. The heater 63 is connected to any suitable source of power, such as a battery or a transformer, and thus serves to heat the cathode. Electrons pass from the heated cathode to the anode when the grid 60 has had its normally negative potential suitably reduced by an out-of-balance condition in the phototubes circuit. A battery 68 having its negative terminal grounded is connected, as illustrated, to the cathode and to the suppressor grid. The other battery terminal connects with the anode 64 through a suitable guidance instrument, such as the galvanometer or milliammeter 69 or a suitable control instrument. The current developed by amplification serves to actuate the needle 70 of the meter. This instrument 69 is so calibrated and the circuits are so arranged that when the aircraft is on the ground and the activated phototubes are in a horizontal plane with the altimeter light source 14 (Fig. 1), then the needle 70 reads zero elevation. When the plane is at the maximum altitude at which the phototubes will receive a beam from the lights 14 the needle will read that maximum elevation, such as 200 feet. The potentiometer contact 57 may be adjusted to give either the maximum or the minimum current value when the plane is on the ground, and the instrument will be calibrated accordingly. These circuits may be modified as readily understood by one skilled in electronics so that the phototube activation is suitably indicated by the guidance instruments 49 and 69.

The mechanical features of the construction are few and simple. As shown in Figs. 14, 15 and 16, the three sets of tubes may be suitably mounted on the aircraft, such as in a light transmitting blister 75 of suitable material suspended from a bottom wall 76 of the craft. In order that the phototubes may be held at definite angles relative to the lights on the ground, I prefer to mount them in a receptacle 77 carried on a rock shaft 78 (Fig. 14) suspended on pivot points 79 adjustably mounted on hangers 80 depending from the wall 76. The pivot points 79 may be the conically shaped ends of adjustment screws 81 suitably threaded into the hangers and engaging recesses in the ends of the shaft 78.

The phototube receptacle 77 is held in a definite or a vertical position by means of a gyroscope of suitable construction. This may comprise a heavy gyroscopic wheel 82 fixed to the vertical shaft 83 and rotated by a suitable electric motor 84 driven from a desired source of power. The shaft is mounted in adjustable cone bearings 85 carried by a gimbal frame 86 which in turn is pivotally mounted on horizontal trunnions 87 pivotally carried in suitable bearings in the outer casing 88. This outer frame is secured to and depends from an arm 89 clamped to the shaft 78. The shaft is arranged lengthwise of the craft or parallel with its direction of flight, so that the gyroscopic wheel keeps the shaft and its supported housing 77 in a fixed position irrespective of any lateral tilting of the aircraft. No compensation need be made for pitching or a changing inclination of the angle of flight of the craft, since the phototubes and the instrument readings will not be materially affected thereby.

The casing or receptacle 77 may be shaped as shown particularly in Fig. 16 with its bottom wall 90 horizontal and two side walls 91 and 92 arranged at suitable angles so that the cathodes of the phototubes will receive the light beam in the extreme apparent positions of the lights. The walls have long narrow aperture slits 93 which correspond with the aperture slits 7 above discussed, and these are so located opposite the centers of the cathodes that the light rays may travel from near one end of each cathode to the other, as the craft moves through the critical angle. The phototubes may be mounted on standards 94, 95 and 96 arranged perpendicular to the supporting walls which are provided with sockets suitably arranged for receiving the prongs 5 and 25 of the tubes. The wiring circuit is not shown in Figs. 14, 15 and 16 for the sake of simplicity of illustration, but it may be made as above described or in accordance with standard practice. The amplifier tubes 36 and 61 may be arranged within this receptacle or otherwise as desired. The electrical leads from these various parts are taken to the panel board on which the instruments are mounted for ready observation by the pilot. The slots 93 are made sufficiently long so that they will receive rays from the light sources irrespective of any pitching of the craft and for the different angular positions of the craft as it approaches the airport. The size of each slot will depend on the size of the associated cathode and their respective locations, but I prefer that the width of slot be about one eighth of the height of the cathode, so as to provide enough electron emission when the plane is at the maximum desired distance from the light on the ground and when the light is obscured to the maximum extent by adverse weather conditions.

The operation of the apparatus will be apparent in view of the above disclosure. The alignment indicating instrument 49 (Fig. 12) is so calibrated that current values above and below the middle value represented by the band G of the activated cathode (Figs. 10 and 11) cause the indicating needle 48 to point always toward the center line of the runway. When the craft is properly aligned over the runway and has come down to a point within the range of the altimeter lights 14, such as an altitude of 200 feet, then the altimeter phototubes (Fig. 13) in alignment with the line I (Fig. 1) will receive light at the upper narrow ends of the cathodes and thus give a low emission and a low current measurement, and as the aircraft descends the light beam will creep downwardly on the cathode plate until the emission is maximum when the plane reaches the ground. Obviously, the cathodes may be reversed in arrangement to give a minimum current for alignment or for zero altitude. In the preferred arrangement illustrated, each tube lies at a definite angle to a vertical plane so that when the craft is on the ground a horizontal light beam from the source 14 will strike near the larger end of the triangular cathode of the altimeter phototube. The sensitive elements of alignment tubes 15 and 30 of Figs. 12 and 15 face vertically downwardly.

It will now be appreciated that various constructions may be employed to insure a variable electron emission as the directive angularity of a light beam from the airport changes relative to a photosensitive element on the aircraft. For example, as shown diagrammatically in Fig. 17, I may employ a rectangular cathode 100 in a standard vacuum phototube and arrange two screens 101 and 102 in front of the phototube in such a manner that the narrow horizontal slot 103 of the screen 101 will transmit only a band of light coming from the airport lights, as explained above relative to screen 8 and its slot 7. The screen 102 has a slot 104 cut therein which tapers from a wide end at the bottom to a narrow end at the top. Thus, as indicated by the broken lines, a ray of light from the electric light bulb 105 (shown in two end positions) passes through the first screen and is then tapered to a short band at the top of the cathode while it remains full length at the bottom of the cathode. Also, various types of light collector may be employed to insure getting the maximum of light activation of the cathode. For example, a collector lens may be so associated with the cathode of each phototube that it will aid in directing against that cathode as much as possible of the light received from the airport. Such a collector lens may be of standard condenser type as is well understood and by its use I may supplement the amplifying tubes or put less burden thereon. It will therefore be understood by one skilled in the sciences of optics and electronics that various constructions may be employed to vary the electron emission of either a standard or a special cathode as the directive angularity of the light changes.

A further aspect of this invention involves so constructing the apparatus that the phototube will not pick up stray light at an airport and give a false indication. For this purpose, I prefer that the airport lights flash intermittently or be modulated at a known frequency and that the electronic pick up apparatus on the plane be tuned to cut out all frequencies not within a specified band. Each of the airport directive lights may be flashed or modulated intermittently by a standard device illustrated diagrammatically in Fig. 18 which is known as a chopped off light. This comprises a suitably driven constant speed motor 110 arranged to rotate a disc 111 at a uniform speed. A standard electric light bulb 112 or one giving a high infrared emission is suitably connected to a power line to give a steady light. The disc 111 is provided with a series of radial slots 114 so arranged relative to the light bulb that as the disc rotates the light will pass intermittently through these slots and then be cut off. This light chopping device may be installed in each of the light positions at spaced intervals on the airport field and suitably directed so that the rays of light will travel within the desired angle as above explained with reference to Fig. 1. The frequency of the chopped light may be as desired, such as 600 cycles per second. A standard 60 cycle alternating current has a flashing or modulation periodicity of 120 cycles per second, hence the chopped light differs materially therefrom in its frequency.

These chopped or flashing light rays are picked up by the associated vacuum phototube, and in order to tune out the effect of any direct light or all other materially different light frequencies I interpose a band pass filter in the phototube grid circuit which is tuned to pass only a pulsating direct current having a frequency within a narrow band including the chopped light frequency, such as 500 to 700 cycles per second for a chopped light of 600 cycles. Such a band pass filter is illustrated diagrammatically in Fig. 19, and this part of the electric circuit may be installed in the position of the dotted rectangle 120 in Figs. 12 and 13. That is, the wire 121 which connects the cathode 1 and the anode 21 of Fig. 12 may be connected through a suitable inductance coil 122 and a condenser 123 with the grid 35 of the amplifier 36. A resonant circuit comprising an inductance coil 125 and a condenser 126 are grounded at 127 to the framework of the aircraft and connected by the line 128 with the wire leading from the condenser to the grid 35.

This is a standard type of band pass filter in which an inductance coil 122 in series and a condenser 126 in parallel form a low pass filter, and the condenser 123 in series and the inductance coil 125 in parallel form a high pass filter. The coil 122 in series in the low pass filter offers little impedance to a low frequency pulsating direct current and a high impedance to a high frequency current, while the capacity 126 in parallel prevents the low frequency current from being shunted across the line. Similarly, the condenser 123 of the high pass filter prevents the passage of a non-pulsating direct current, but does not impede seriously the passage of a high frequency pulsating direct current; and the high frequency current meets a high impedance in the shunt inductance 125. Thus, the band pass filter made up of a combination of these high and low pass filters may be tuned to permit the passage of a rapidly pulsating direct current which has a frequency near that of the chopped light. A proper selection of inductance and capacity values in each half of the band pass filter will tune out or materially attenuate all frequencies above and below the band that includes the chopped light frequency. The construction and tuning of the filter parts is well understood by those skilled in the electronics. A similar band pass filter may be installed in the position 120 of Fig. 13.

When the flashing light is used, the vacuum photo tube is activated intermittently and it gives instantaneously an electron emission in synchronism with the chopped light. This results in a pulsating variation of the amplifier grid potential, and the amplifier tube provides a synchronized pulsating direct current only when the phototube is activated and thus at the chopped light frequency. The indicating instruments are of suitable construction, such as a D'Arsonval galvanometer, for measuring the pulsating direct current of the selected frequency band. Various modifications may be made in the electric circuits in accordance with the special requirements of any installation.

For the source of light waves employed at the airport, I may use electromagnetic waves between 2,000 and 20,000 Angstrom units. I prefer to employ a standard Mazda 50 candle power automobile headlight bulb or one of higher power, if required. This type of lamp gives a high infrared radiation which penetrates fog, clouds, dust, snow, sleet, rain, or other atmospheric storm conditions and will activate the landing instrument at distances of 1,000 feet or more. The beams from the alignment light sources 12 should reach to sufficient altitude so that the pilot will be fully informed of his position before he needs to determine the altitude. He may be guided by the standard radio beams until he gets near the airport. The altimeter light source will not be needed until the plane is within a few hundred feet of the ground for the average local terrain. Thus, I make it possible to land during the daytime when there is daylight to effect the phototubes and at night when other lights of the airport are on.

For the phototube, I may use an argon gas filled phototube PJ23, which is most sensitive to wave lengths between about 3,000 and 12,000 Angstrom units and is particularly useful for waves about 7,000 Angstroms, or for infrared light. I may also employ a vacuum phototube. The amplifier tube is likewise a vacuum tube of suitable standard construction and its circuits will depend on the nature of the tube, whether triode, tetrode, pentode or other type; and multiple stage amplification may be employed, if desired.

Instead of batteries or a D. C. motor, I may employ a source of alternating current for the phototube circuit, as is well understood in the art. For example, a condenser may be connected between the phototubes and amplifier cathode and with one plate connected to the grid, so that the condenser is charged during one-half cycle through one phototube and then charged in the opposite direction during the next half cycle by the other phototube. If the vacuum type phototubes are equally illuminated, the direct current voltage across the condenser is zero, but unequal illumination sets up in the condenser a direct current voltage whose magnitude varies with the variation in electron emission of my special light sensitive phototube. Hence, the alternating current circuit including a condenser may be employed to vary the grid potential of the amplifier tube and thus to govern the aircraft guidance mechanism.

Aircraft control apparatus may be employed in place of the indicating instruments above described, and this guidance mechanism may be of various types within the requirements of aircraft operation.

It is to be understood that, in the description of this invention and in the claims, any variation in illumination and in the area of activated cathode surface which arises solely from the spreading of the light beam, which varies with the cosine of the angle of light incidence, is to be disregarded, since both phototubes are affected the same by the light falling on the two cathodes at the same angle. In that case, the more oblique the angle of incidence, the less is the illumination per unit area, and a narrow band of light will cover a greater area approaching infinity as the angle of incidence changes from a line perpendicular to the surface to parallelism therewith. Hence, the claims are to be interpreted as not referring to a variation in illumination caused by a change in the angle of incidence, but as referring to an increase or a decrease in electron emission caused respectively by an increase or decrease in the area of activation.

It will now be appreciated that various modifications may be made in this invention within the knowledge of one skilled in the art, hence the above description is to be interpreted as an explanation of the principles of my invention and of preferred embodiments and not as imposing limitations on the claims appended hereto.

I claim:

1. An apparatus for aiding the landing of aircraft on a runway comprising a horizontal line of light extending in the direction of the runway and throughout the effective distance of aircraft approach, electronic apparatus comprising a light sensitive element mounted on the craft in a stationary position where it may face towards the light when the craft approaches for landing on the runway, a light shield for limiting the activation of the element to substantially unidirectional rays from said light, said element and shield providing a progressively varied area of activation between a definite minimum and maximum as the directive angularity of the light varies within a predetermined angle defined by the relative positions of the element and light when the craft is on the ground and at a predetermined position thereabove, an electrical circuit connected to said element and responding to a variation in said area of activation, and a craft position determining electrical mechanism governed by said circuit.

2. An apparatus for aiding the landing of aircraft on a runway comprising a horizontal line of light extending in the direction of the runway and throughout the effective distance of aircraft approach, electronic apparatus comprising a photo-emissive tube having a light sensitive cathode mounted on the craft in a stationary position where it may face towards the light when the craft approaches for landing on the runway, a light shield for limiting the activation of the cathode to substantially unidirectional rays from said light, said cathode and shield providing a progressively varied area of activation so that the electron emission varies as the directive angularity of the light varies within a predetermined angle defined by the relative positions of the tube and light when the craft is on the ground and at a predetermined position thereabove, an electrical circuit connected to said phototube and responding to a variation in the electron emission caused by said change in area of activation, and a craft position determining electrical mechanism governed by said circuit.

3. An apparatus for aiding the landing of aircraft on a runway comprising a horizontal light row extending in the direction of the runway and throughout the effective distance of aircraft approach, electronic apparatus comprising two light sensitive elements arranged in series in a substantially balanced electrical circuit, means for supporting the two elements in a substantially stationary position where they face in the same direction for activation by said light when the craft approaches for a landing, means including a light shield having an aperture for directing a substantially unidirectional beam from said light to each element, one of said elements and its shield providing a predetermined, progressively varied area of activation of the element as the directive angularity of the light changes within an angle determined by the relative locations of the light and the element when the craft is on the ground and at a given flight position, the other element serving to balance the effect of ambient light in said circuit, an amplifier circuit connected to and governed by changes in the voltage distribution between said elements, and electrical mechanism governed by said amplifier circuit which interprets the light angularity as the craft position.

4. An apparatus for aiding the landing of aircraft on a runway comprising two horizontal parallel rows of light extending in the direction of the runway and throughout the effective distance of aircraft approach, one aiding in determining alignment with the runway and the other being an altimeter governing light row located at a fixed distance from and parallel with the runway center line, two photocells on the craft having light sensitive elements, means for supporting the two elements in substantially stationary positions so that one faces towards the altimeter light row and the other element faces towards the other light row as the craft approaches for a landing, a light shield for limiting the activation of each element to substantially unidirectional light rays, each element and its shield providing a predetermined progressively varied area of activation of the element as the directive angularity of the activating light varies within an angle determined by the relative locations of the craft on the runway and at a given flight position, an electrical circuit connected to and governed by a variation in activation of each element, an alignment indicator controlled by the circuit of the element governed by the alignment aiding light row which indicates when the craft is over the runway center line, and an altimeter controlled by the circuit of the element activated by said alignment light row which translates the angles of incidence of the light on the element as altitude when the alignment indicator shows that the craft is over the runway center line.

5. Apparatus according to claim 4 in which each of said photocells has a tapered light sensitive cathode and the shield has a narrow aperture providing a band of light which moves from the narrow to the wide end of the cathode as the craft changes in position relative to each light row, so that the electron emission of each element increases with an increase in the activated area and governs the associated instrument accordingly.

6. Apparatus according to claim 4 in which the lights of each row are modulated to a definite frequency, and the electrical circuit connected to each photo element comprises a band pass filter tuned to the frequency of the activating light so that each indicator is not affected by ambient light.

7. An apparatus for aiding the landing of aircraft on a runway comprising a line of light extending in the direction of the runway and throughout the effective distance of aircraft approach, electronic apparatus including a phototube on the craft having a cathode provided with a tapered light activated surface, means for directing against a portion of said surface a narrow band of light directed from the runway row of light, said surface being so arranged that an increased area thereof is activated as the directive angularity of the light beam changes and so causes an increase in electron emission in said tube, a phototube circuit connected to said tube and guidance apparatus connected in said circuit which is governed by said variation in electron emission.

8. An apparatus for aiding the landing of aircraft on a runway comprising a horizontal line of light extending in the direction of the runway and throughout the effective distance of aircraft approach, electronic apparatus comprising a light sensitive element mounted on the craft in a stationary position where it may face towards the light when the craft approaches for landing on the runway, a light shield having an aperture for limiting the activation of the element to a narrow band of substantially unidirectional rays from said light, said element having a tapered, light sensitive surface positioned relative to the aperture so that the light activates a progressively varied area of the element between a definite minimum and maximum as the directive angularity of the light varies within a predetermined angle defined by the positions of the element and light when the craft is on the ground and at a predetermined position thereabove, an electrical circuit connected to said element and responding to a variation in said area of activation, and a craft position determining electrical mechanism governed by said circuit.

9. An apparatus for aiding the landing of aircraft on a runway comprising a horizontal light row arranged parallel with and widely spaced from the runway center line, a phototube amplifier circuit on the aircraft including a phototube having a light activated cathode therein facing towards the light row when the craft descends for a landing, the light sensitive surface of which cathode tapers from a wide to a narrow portion, a shield having a light aperture therein, the cathode and shield being so arranged that a band of light directed from said light row may traverse from a narrow to a wide portion of the cathode sensitive surface as the aircraft changes its elevation, and electrically operated guidance mechanism controlled by the phototube amplifier circuit which triangulates the angularity of the light as aircraft altitude.

10. An apparatus for aiding the landing of an aircraft on a runway comprising a horizontal row of lights fixed at a distance from and parallel to the runway center line, two phototubes on the craft having light activated cathodes arranged in series in a power circuit, supports for the tubes whereby both face towards and are activated by a light beam from the lights when the craft descends for a landing, a shield having an aperture which limits the activation of each cathode to a narrow band of light, the cathode and shield of one tube being so arranged that the cathode has its light activated area varied to a predetermined extent as the directive angularity of the light beam varies while the craft descends through a given angle to the runway, and thereby changing the voltage distribution between the two tubes, an amplifier tube having its grid potential governed by said voltage change, and electrical mechanism actuated by the amplifier which triangulates the angularity of the light beam as aircraft altitude.

11. An apparatus for aiding the landing of an aircraft on a runway comprising a line of light extending in the direction of the runway and throughout the effective distance of aircraft approach, a phototube circuit on the craft including a phototube having a cathode, the light activated surface of which tapers, means for holding the cathode in a position during flight of the aircraft where it may be activated by a beam from said line of light at the runway, means associated with the cathode including a shield having a narrow light aperture therethrough which causes a beam of light from said source to traverse from a narrow to a wider cathode surface and activate a varying area of the cathode as the angularity of the beam changes relative thereto and thus cause an increased electron emission as the activated area increases, a guidance device and an amplifier circuit connected to said tube circuit and controlled by said phototube, the amplifier circuit governing the device in accordance with a variation in the electron emission of the cathode.

12. An apparatus for aiding the landing of aircraft on a runway comprising a horizontal line of light extending in the direction of the runway throughout the effective distance of aircraft approach, electronic apparatus including a photocell having a light sensitive element in a stationary position on the craft where it may face towards the light during a landing approach, means for directing a band of light towards the element, a light shield in front of the element having an aperture that tapers so as to vary the cross sectional area of the light band and vary the activation of the element in accordance with a change in the directive angularity of the light within a predetermined angle defined by the relative positions of the light and the element when the craft is on the ground and at a predetermined altitude, an electrical circuit connected to said cell and responding to a variation in light activation of the element, and a craft position determining electrical mechanism governed by said circuit.

13. An apparatus for aiding the landing of aircraft on a runway comprising a row of aligned lights at the airport which are parallel to and remote from the center line of the runway and which are modulated at a non-standard frequency, guidance mechanism on the craft, a phototube amplifier circuit controlling said mechanism which includes a phototube having a tapering cathode, means including a shield having an aperture for directing onto the cathode a narrow band of the modulated light, said shield and cathode being so arranged that the electron emission varies as the directive angularity of the light changes when the craft descends for a landing, an amplifier tube in said circuit having its grid potential controlled by the phototube, and a band pass filter in said circuit tuned to about the frequency of the modulated light which lessens the effect of stray light on the phototube.

ROBERT J. HERBOLD.

REFERENCES CITED

The following references are of record in the file of this patent:

UNITED STATES PATENTS

| Number | Name | Date |
|---|---|---|
| 1,387,850 | Hammond | Aug. 16, 1921 |
| 1,926,824 | Stogoff | Sept. 13, 1933 |
| 1,934,437 | Lucas | Nov. 7, 1933 |
| 1,936,400 | Langmuir | Nov. 21, 1933 |
| 2,070,178 | Pottenger | Feb. 9, 1937 |
| 2,084,865 | Penning et al. | June 22, 1937 |
| 2,139,057 | Brockstedt | Dec. 6, 1938 |
| 2,206,036 | Herson | July 2, 1940 |
| 2,216,716 | Withem | Oct. 1, 1940 |
| 2,234,329 | Wolff | Mar. 11, 1941 |
| 2,277,285 | Woodling | Mar. 24, 1942 |
| 2,297,534 | Brulin | Sept. 29, 1942 |
| 2,350,820 | Rettinger | June 6, 1944 |
| 2,366,939 | Smith et al. | Jan. 9, 1945 |
| 2,415,178 | Hurley | Feb. 4, 1947 |